(12) United States Patent
Thiele et al.

(10) Patent No.: US 12,635,825 B2
(45) Date of Patent: May 26, 2026

(54) FOOD PROCESSOR INCLUDING POTATO PEELING DISC SYSTEM AND METHOD

(71) Applicant: VORWERK & CO. INTERHOLDING GMBH, Wuppertal (DE)

(72) Inventors: Tobias Thiele, Radevormwald (DE); Svenja Stolze, Grevenbroich (DE); Andreas Heynen, Radevormwald (DE); Felix Thies, Wuppertal (DE); Michael Sickert, Ennepetal (DE); Kevin Schmitz, Haan (DE); Sebastian Jansen, Bochum (DE); Lukas Irnich, Hürtgenwald (DE); Malte Becker, Aachen (DE); Maximilian Klodt, Aachen (DE); Lars Müller-Tönissen, Aachen (DE)

(73) Assignee: VORWERK & CO. INTERHOLDING GMBH (DE)

( * ) Notice: Subject to any disclaimer, the term of this patent is extended or adjusted under 35 U.S.C. 154(b) by 1007 days.

(21) Appl. No.: 17/849,001

(22) Filed: Jun. 24, 2022

(65) Prior Publication Data

US 2023/0029428 A1     Jan. 26, 2023

(30) Foreign Application Priority Data

Jul. 21, 2021     (EP) ..................................... 21186949
Feb. 23, 2022     (EP) ..................................... 22158305

(51) Int. Cl.
$A47J\ 17/18$   (2006.01)
$A23N\ 7/02$   (2006.01)
$A47J\ 43/046$   (2006.01)

(52) U.S. Cl.
CPC ................ *A47J 17/18* (2013.01); *A23N 7/02* (2013.01); *A47J 43/046* (2013.01)

(58) Field of Classification Search
CPC ...... A47J 43/0716; A47J 17/18; A47J 43/046; A23N 7/02
(Continued)

(56) References Cited

U.S. PATENT DOCUMENTS

| | | | |
|---|---|---|---|
| 2,452,567 A | 11/1948 | Harris et al. | |
| 3,266,540 A | 8/1966 | Bradham | |

(Continued)

FOREIGN PATENT DOCUMENTS

| | | |
|---|---|---|
| CN | 104322645 A | 2/2015 |
| CN | 107529810 A | 1/2018 |

(Continued)

OTHER PUBLICATIONS

Search Report for Application No. EP21186949.0 dated Jan. 28, 2022 (2 pages).
(Continued)

*Primary Examiner* — Phuong T Nguyen
(74) *Attorney, Agent, or Firm* — Barnes & Thornburg

(57) ABSTRACT

A potato peeling disc for peeling potatoes has a central opening formed by an inner contour of the potato peeling disc. A surface of the potato peeling disc comprises a plurality of teeth. The teeth have an orientation such that potatoes are peeled by the teeth by rotating the potato peeling disc in a first direction of rotation about a central axis which is coaxial with the central opening.

19 Claims, 6 Drawing Sheets

(58) Field of Classification Search
        USPC ................................... 99/348, 537, 538, 637
        See application file for complete search history.

(56)                    References Cited

U.S. PATENT DOCUMENTS

|             |      |         |                          |
| ----------- | ---- | ------- | ------------------------ |
| 3,762,308   | A    | 10/1973 | Greene et al.            |
| 2003/0094522 | A1  | 5/2003  | Cordiero                 |
| 2012/0272835 | A1  | 11/2012 | Fister et al.            |
| 2014/0061344 | A1* | 3/2014  | Conti ................... A47J 43/255 |
|             |      |         | 241/296                  |
| 2018/0206677 | A1* | 7/2018  | Ivarsson ................ A47J 36/24 |
| 2019/0307049 | A1* | 10/2019 | Ruckle ................... B24B 3/466 |

FOREIGN PATENT DOCUMENTS

| DE  | 1148714 B      | 5/1963  |
| --- | -------------- | ------- |
| KR  | 20120126520 A  | 11/2012 |
| WO  | WO2005122801 A1 | 12/2005 |
| WO  | WO2016168889 A1 | 10/2016 |

OTHER PUBLICATIONS

Chinese Office Actions for Application No. 202210864218.6, dated Oct. 28, 2025, 7 pages.

* cited by examiner

FOOD PROCESSOR INCLUDING POTATO PEELING DISC SYSTEM AND METHOD

CROSS-REFERENCE TO RELATED APPLICATIONS

This application claims benefit of priority from European Application No. 21186949.0, filed Jul. 21, 2021, and European Application No. 22158305.7, filed Feb. 23, 2022. The disclosures of each of these applications are hereby incorporated in their entirety by reference herein.

TECHNICAL FIELD

The present disclosure relates to a potato peeling disc for peeling potatoes, a food processor with a potato peeling disc, and a method for peeling potatoes.

BACKGROUND

There are potato peeling machines that rotate discs with an abrasive surface to peel potatoes. Among the known potato peeling machines are, for example, Kenwood Chef AT444 and Melissa 16220007. The abrasive surface used there is created by a plurality of rotationally symmetrical protrusions. The protrusions have a dimple shape that looks similar to small hemispheres on a flat surface and project perpendicular to the surface.

SUMMARY

The present disclosure is directed to a further developed potato peeling disc and a method for peeling potatoes. The potato peeling disc has in particular a central opening, which is preferably formed by an inner contour of the potato peeling disc. A surface of the potato peeling disc comprises a plurality of teeth. The teeth have an orientation such that potatoes are peeled or can be peeled by the teeth by rotating the potato peeling disc in a first direction of rotation about a central axis, which is in particular coaxial with the central opening. The efficiency of the peeling process and the efficiency of the food preparation as a whole can be increased in this way. Due to the orientation of the teeth, potatoes can be peeled in a particularly short time. At the same time, the prerequisite is created that by changing the direction of rotation without changing or turning over the potato peeling disc, additional processing of the potatoes can be carried out, for example slow cooking, cooking of a food in a plastic bag (also referred to as "sous vide") or polishing, i.e. smoothing of a previously roughened potato surface.

A potato peeling disc is a rotatable disc with an abrasive surface for peeling potatoes. A potato peeling disc for peeling potatoes can also peel other vegetables with a peel, in particular other root vegetables such as beets and carrots. In particular, the thickness of the potato peeling disc is at least 1% and/or at most 5% of its diameter. In one configuration, metal, preferably stainless steel, particularly preferably V2A, is used to produce the potato peeling disc or at least a disc portion of the potato peeling disc that includes the surface with the teeth. In particular, the disc part is produced from a metal sheet, preferably by forming by means of a press, for example to form the teeth.

The central opening serves for coupling to a drive for rotating the potato peeling disc. The central opening extends coaxially to the central axis. The central axis is the axis of rotation of the potato peeling disc. The central opening may be designed as a through opening, as a central opening open on one side, i.e. as a recess, or as a recess with a through opening in the base of the recess. The inner contour forming the central opening comprises the surfaces delimiting the central opening.

A tooth with an orientation is not and cannot be a rotationally symmetrically shaped tooth. Orientation of a tooth means that the tooth is oriented in a direction parallel to the adjacent surface of the potato peeling disc. An oriented tooth is oriented such that its orientation points in the direction in which the tooth allows peeling. In particular, a height of the tooth increases in the direction of its orientation so that the height of the tooth is lower at the beginning than at the end of the extension of the tooth in the direction of its orientation. In the following, orientation and direction of orientation are used as synonyms. The teeth peel the potato by removing the surface of the potato having the peel, wherein each tooth interacts with only a small portion of the potato surface.

DETAILED DESCRIPTION

Figure 1:
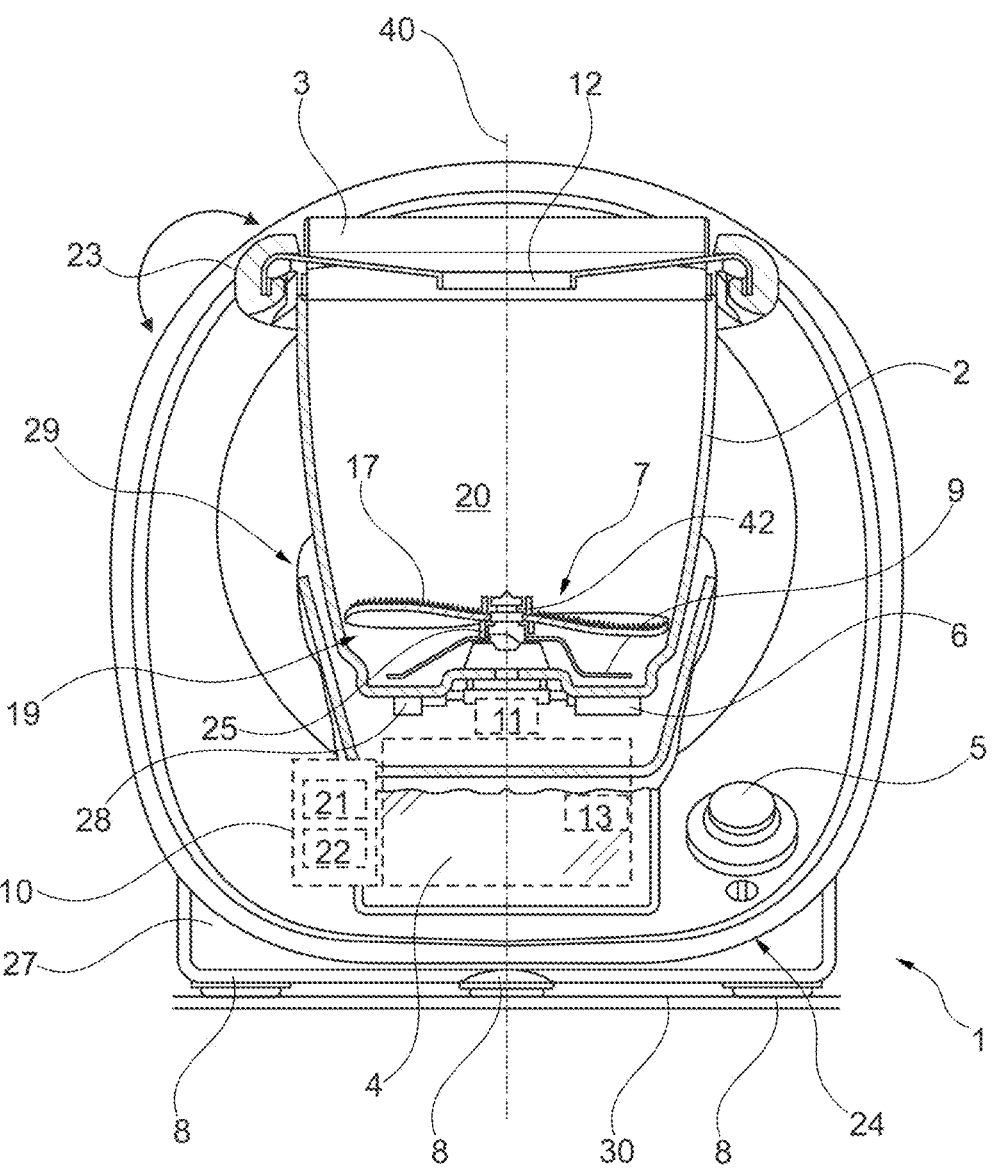
FIG. 1 illustrates a schematic representation of a potato peeling disc according to the invention, which is manually releasably attached in a food processor.

FIG. 1 shows a food processor 1 for performing a food preparation process in a food preparation vessel 2. A heating element 6 may be provided for heating a food 20, in particular in the bottom region of the food preparation vessel 2. A rotatable tool 9, in particular with a cutting edge, may be used inserted for chopping and/or mixing the food 20, which is coupled to a drive 11 via a shaft not shown; in particular through an opening in the bottom of the food preparation vessel 2. A housing 27 of the food processor encloses the drive 11 and provides a receptacle 29 for the food preparation vessel 2. The food processor 1 has a control device 10 for controlling the functional component such as heating element 6, tool 9 and/or drive 11. Measurement sensors for detecting an actual state such as a temperature sensor 28 may be provided. In particular, at least one weight sensor 8 is provided in a standing feet of the food processor 1 through which the housing 27 stands on a base 30. The control device 10 comprises a processor 21 and a memory 22.

A lid 3 may be provided for closing the food preparation vessel 2. The lid 3 may include a lid opening 12 for introducing ingredients into the food preparation vessel 2 predominantly covered by the lid 3. A locking device 23 may be provided to lock the lid 3 in the closed state, for example with rollers as shown in FIG. 1, by a pivoting movement illustrated with arrows.

A user interface 24, which in particular comprises a touchscreen display 4 or a button 5, can be used by the user to obtain information and instructions from the control device 10 and to make inputs to the control device 10. For this purpose, the user interface 24 may comprise user-actuatable icons 13 on the touchscreen display 4. Preferably, the control device 10 has access to digital recipes with multiple recipe steps that can be implemented by means of the user interface 24 by the user and the food processor to prepare a food 20. In this way, a user can, for example, activate a peeling function or perform a peeling process as desired by adjusting the speed of rotation after the potato peeling disc 7 is mounted on the tool 9 by the user.

Based on one or more cooking parameters defined in the digital recipe or manually set by the user via the user interface 24, the control device 10 ensures that a food 20 is prepared in the food preparation vessel 2 in a desired manner by controlling the heating element 6 and/or the drive 11 accordingly. The peeling process may be programmed as a recipe step in such a digital recipe.

A potato peeling disc 7 with a wave shape 19 and a plurality of teeth 17 is releasably attached to the tool 9. A driving torque is transmitted to the potato peeling disc 7 in particular by means of the driver 25 from an arm of the tool not visible in FIG. 1, which is normally only used for chopping food 20 with its cutting edge. In operation, the driver 25 is in contact with an arm of the tool 9 in the direction of rotation (not visible due to the sectional representation of FIG. 1). The potato peeling disc 7 is thus rotated around the central axis 40. Potatoes as food 20, which are introduced from above into the food preparation vessel 2 and onto the potato peeling disc 7, can be peeled in this way, in particular in a water bath not shown. Preferably, 600 ml of water is added to the food preparation vessel for the water bath. The various possibilities with regard to food preparation in dependence of the direction of rotation are explained in the context of FIG. 3.

Figure 2:
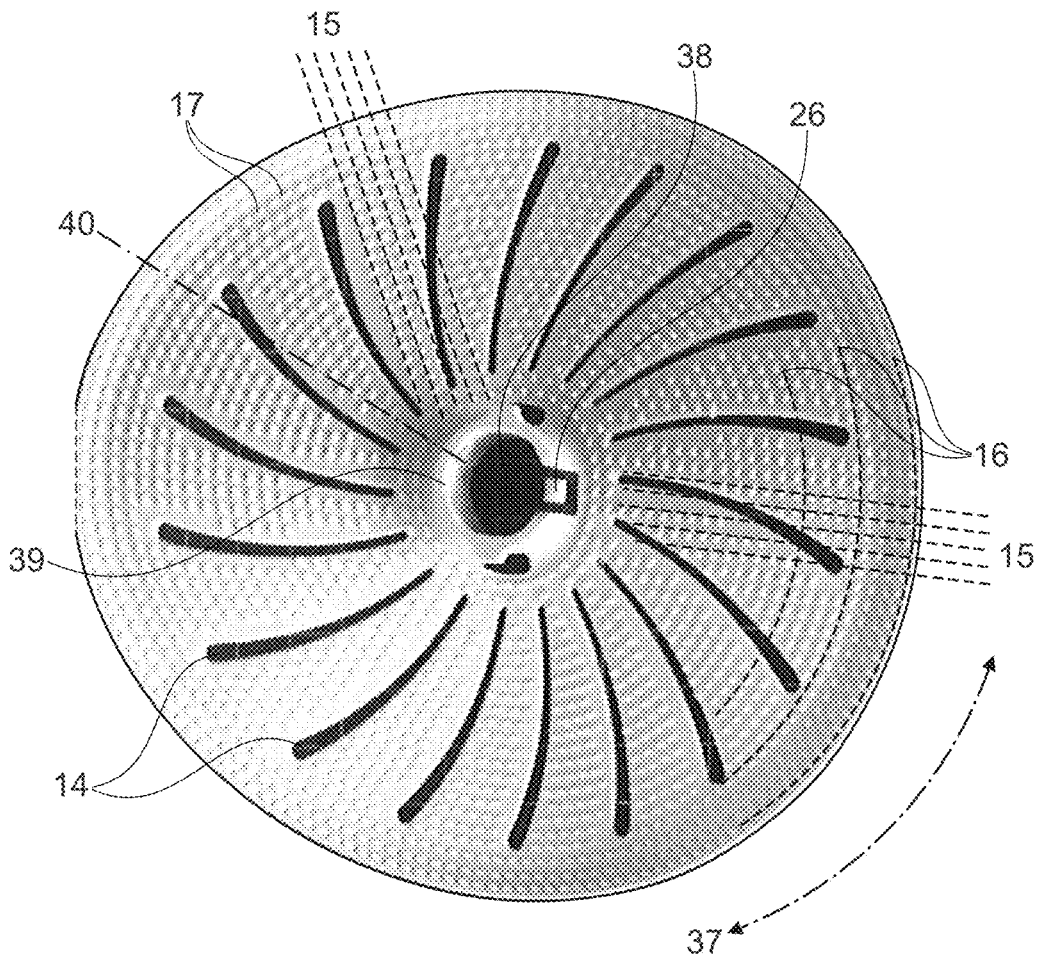
FIG. 2 illustrates a schematic representation of a potato peeling disc according to the invention in a slightly spatially inclined top view.

FIG. 2 shows a potato peeling disc 7 according to the invention, in particular with a diameter of at least 120 mm and/or at most 160 mm, preferably about 135 mm or 148 mm. As a result of the wave shape 19 (cf. FIG. 1), the potato peeling disc 7 shown has a height of at least 20 mm and/or at most 40 mm, preferably about 30 mm. A latching element 26, which projects to the central axis 40 and can be elastically moved radially, serves to connect to a rotationally symmetrical drive body, which preferably has a circumferential groove 42 into which the latching element 26 can snap. In this way, the latching element 26 forms a snap lock. In particular, the snap lock is preferably integrally formed in the inner contour 39 which bounds the opening 38.

The potato peeling disc 7 comprises a plurality of slits 14 which extend arcuately within the inner and outer boundaries of the potato peeling disc 7 in a substantially radial direction and are spaced evenly from one another in the circumferential direction 37.

In one configuration, the teeth 17 of the potato peeling disc are arranged in parallel rows 15. In particular, a row 15 is straight. Preferably, the mutually parallel rows 15 run parallel or substantially parallel to a radial direction with respect to the central axis 40. In one configuration, the orientation of the teeth 17 is substantially perpendicular to the row 15. In one embodiment, teeth 17 of two adjacent rows 15 have parallel orientations. Because naturally only one row can extend radially outward from the central axis 40 and the rows parallel thereto necessarily extend eccentrically outward, the orientations of the teeth 17 of the eccentrically extending rows are not oriented in the circumferential direction. Nevertheless, this type of arrangement enables particularly homogeneous and thus efficient peeling, because an acceptable peeling result is obtained in a particularly short time. In one configuration, several groups of rows are provided, each with parallel rows and parallel orientation of the teeth. Several, preferably at least four, particularly preferably at least eight, such groups of rows may then be provided around the central opening over the entire circumference. The rows of two circumferentially adjacent row groups then include an angle to each other so that the rows do not have an excessive deviation to the radial direction and the teeth 17 do not have an excessive deviation to the circumferential direction. In one configuration, the rows cross the annular tracks at an angle of at least 60° and/or at most 120°. In one configuration, in particular in a region around a slit, a part of the teeth 17 is not arranged flush with adjacent teeth 17 of a row 15 in order to obtain a higher tooth density despite the slits. The individual arrangement of teeth 17 adjacent to slits 14 have been arranged according to purely aesthetic considerations.

In the exemplary embodiment of FIG. 2, the teeth 17 arranged in a plurality of annular tracks 16 while, are at the same time, they also form groups of parallel rows 15 extending substantially radially. Preferably, the orientation of the teeth 17 is perpendicular to the respective row 15.

Figure 3:
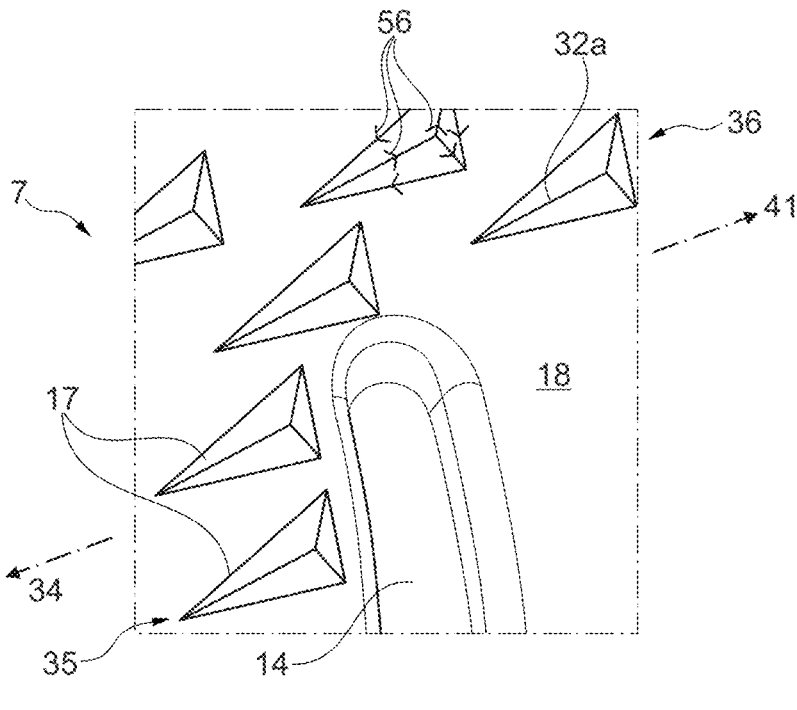
FIG. 3 illustrates a schematic representation of a detailed view of the surface of a potato peeling disc according to the invention.

FIG. 3 shows a detailed view of a potato peeling disc 7 according to the invention. The teeth 17 are distributed here on annular tracks (analogous to FIG. 2), particularly in the area of the slits 14, in such a way that the greatest possible density of the arrangement is achieved. In one configuration, the teeth 17 have a width transverse to their orientation of at least 1 mm and/or at most 5 mm, preferably at most 2 mm. In one configuration, the teeth 17 have a length parallel to their orientation of at least 1 mm and/or at most 5 mm. In one configuration, the teeth 17 have a height of at most 2 mm, but at least a height of 0.5 mm. In particular, the teeth are longer than wide and/or longer than high and/or wider than high and/or approximately as high as wide at a front side 36 of the teeth 17.

In the particular exemplary embodiment of FIG. 3, the teeth 17 have an exemplary shape of a tetrahedron with a triangular surface at the front 36 pointing in the direction of orientation. To the rear 35, the teeth have two triangular surfaces extending laterally from a bevel 32a to the surface 18 of the potato peeling disc 7. The bevel 3a extends from the surface 18 from the rear side to the upper corner of the triangular surface of the front side 36. The teeth 17 are shaped steeper towards the surface 18 of the potato peeling disc 7 at the front side 36 than at the opposite rear side 35.

In one configuration, all edges are provided with edge radii 56, as schematically symbolized in FIG. 3.

Preferably, the first direction of rotation 41, which essentially points in the direction of orientation of the teeth 17, corresponds to clockwise rotation and the opposite, second direction of rotation 34 corresponds to counterclockwise rotation. Alternatively, the first direction of rotation 41 may correspond to counterclockwise rotation and the second direction of rotation 34 to clockwise rotation (see FIG. 3).

For peeling, the direction of rotation points substantially in the direction of orientation of the teeth, as shown by the first direction of rotation 41 of FIG. 3. By using a reversed second direction of rotation 34, which is substantially opposite to the direction of orientation of the teeth 17, a food preparation of the type "slow cooking" and "sous vide" can be performed with the potato peeling disc 7 mounted in the same way on the tool 9, which will be explained in the following in connection with the food processor shown in FIG. 1 and can also be implemented analogously with the rectangularly ramp-shaped teeth 17 of the potato peeling disc of FIGS. 5A and 5B.

For food preparation of the "slow cooking" and "sous vide" type, the potato peeling disc 7 is mounted on the tool 9. Water and ingredients (with or without a bag around the ingredients or food 20) are filled into the food preparation vessel 2. The user can start the food preparation process via a mode of the kitchen appliance 1 supported by the control 10 or by appropriate manual settings of an operation time, a temperature and rotation speed of the tool 9. The wave shape 19 and the rotational movement of the potato peeling disc 7, which is driven by the tool 9, causes a uniform mixing and temperature distribution in the food preparation vessel 2 an optimal cooking of the food 20. Due to the compact design and wave shape 19 of the potato peeling disc 7, the volume of the food preparation vessel 2 can be optimally used. The teeth 17 have no effect on the food 20 in the second direction of rotation 34. Due to the rotation behavior in this mode, a uniform temperature distribution of the food in the food preparation vessel 2 can be obtained. In one configuration, a digital recipe and/or the control 10 is configured such that by means of the potato peeling disc 7 a combined process such as peeling and polishing, peeling and cooking, soaking and peeling and/or obtaining a different surface finish can be obtained for different foodstuffs, ingredients and/or foods such as potatoes or beets. Furthermore, a complex food preparation process is enabled (for example, by a corresponding digital recipe or a corresponding manual setting on the food processor) in which foodstuff is first peeled, then polished and finally cooked, preferably without releasing, turning or changing the potato peeling disc 7. The user support of such a complex food preparation process can be minimized or even eliminated except for activating the digital recipe and feeding the ingredients. In one configuration, it is provided that the potato peeling disc 7 has a further functional surface on the underside, e.g. a smooth surface, with which slow cooking and sous vide can also be performed.

Figures 4A, 4B:
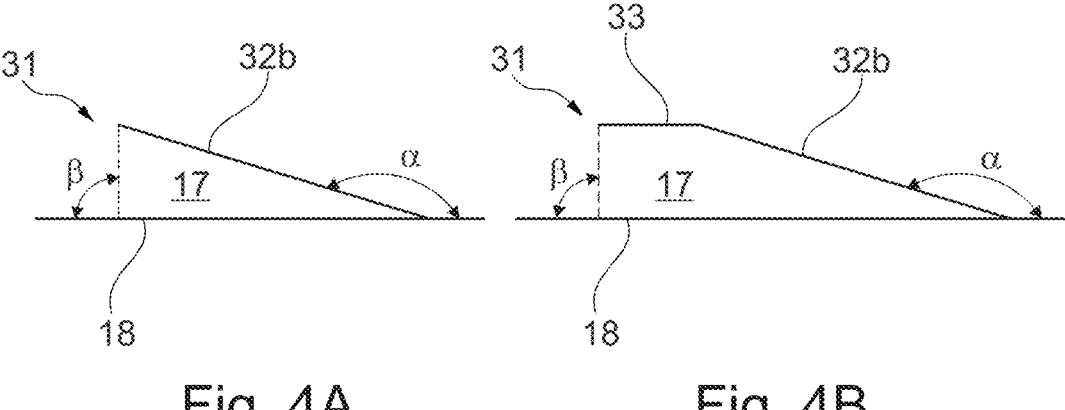
FIG. 4A illustrates a schematic representation of first tooth variants of a potato peeling disc according to the invention.
FIG. 4B illustrates a schematic representation of second tooth variants of a potato peeling disc according to the invention.

FIGS. 4A and 4B show two tooth variants of potato peeling discs 7 according to the invention, applicable for example to the configurations in FIGS. 2, 3, 5A and 5B, in a side view transverse to the orientation of the respective tooth 17. Both tooth variants are ramp-like and also ramp-shaped. In the tooth variant of FIG. 4A, the tooth 17 has (a bevel 32a or) a beveled surface 32b on the rear side with an angle α between 140° and 170° to the surface 18 of the potato peeling disc 7. The tooth variant shown in FIG. 4B has, in addition to the tooth variant of FIG. 4A, a plateau 33 which adjoins the end of the beveled surface 32b. The plateau preferably runs straight and/or substantially parallel to the surface 18 of the potato peeling disc 7. In the tooth variants of FIGS. 4A and 4B, the beveled surface 32b and/or the plateau 33 can be made of sheet metal or delimit a projection made of solid material from the surface 18. The protrusion may also be created by forming a sheet metal. The peeling edge 31 preferably has an angle β to the surface 18 between 80° and 100°, preferably about 90° or 91°. A closed region of the surface 18 or a passageway preferably extends between the peeling edge 31 and the surface 18. In one configuration, the bevel 32a or the beveled surface 32b of a ramp-like tooth 17 are straight, planar and/or have a constant pitch, in particular over their entire extent without consideration of edge radii or the like.

In one embodiment, the teeth 17 have an angular shape and/or each has a first surface at the rear at an angle α to the surface 18 of the potato peeling disc 7 and/or a second surface at the front at an angle β to the surface 18 of the potato peeling disc 7 (cf. FIG. 4B). A plateau, which is preferably straight and/or substantially parallel to the surface 18 of the potato peeling disc 7, connects the first surface and the second surface. In particular, the angle α and/or the angle β is between 80° and 100°, preferably about 90°. A normal of the first and/or second surface is oriented tangentially, substantially tangentially or parallel to the circumferential direction of the potato peeling disc 7.

Figures 5A, 5B:
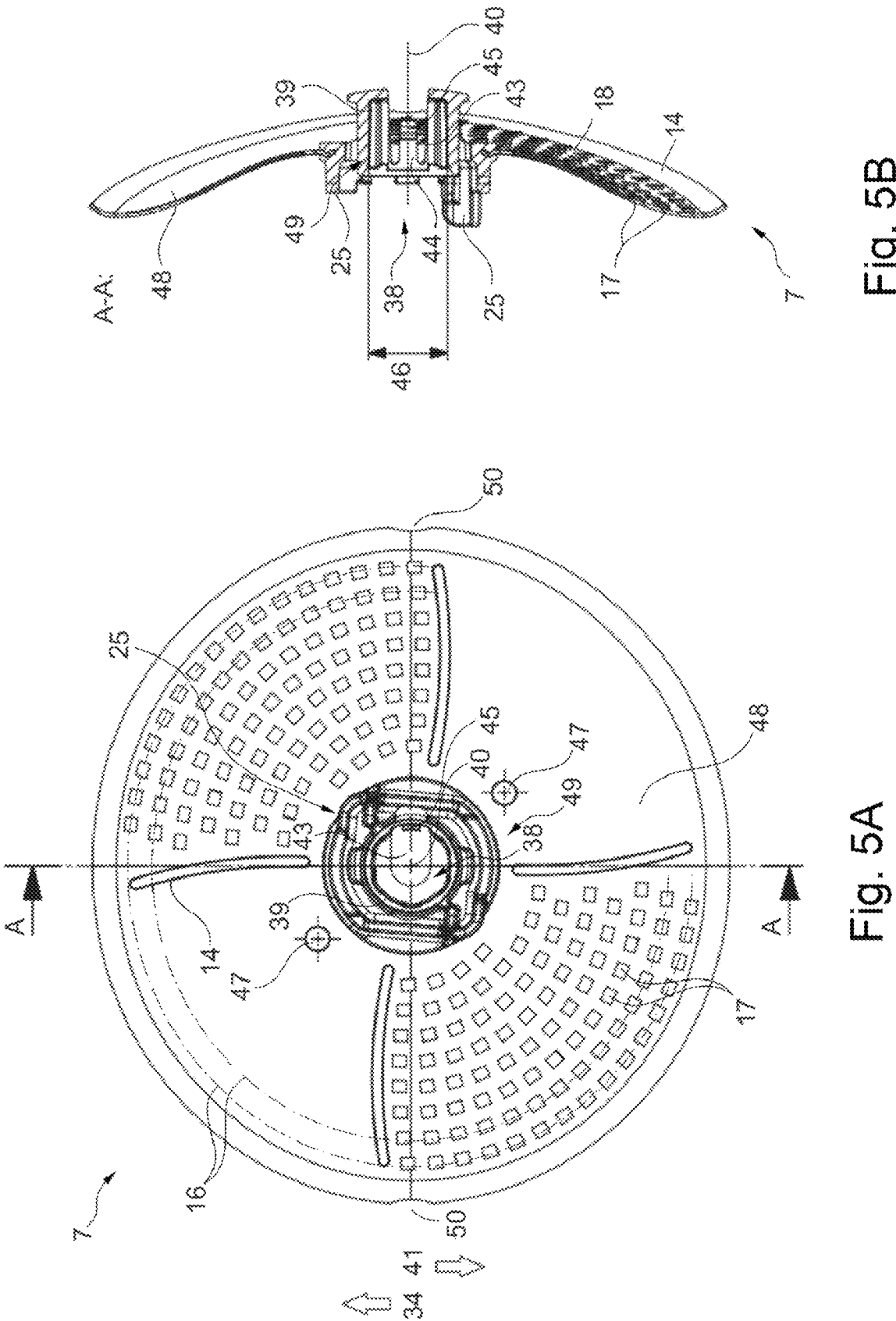
FIG. 5A illustrates a schematic representation of the underside of a potato peeling disc according to the invention.
FIG. 5B illustrates a schematic sectional representation centrally through the potato peeling disc in particular of FIG. 5A.

FIG. 5A shows a schematic representation of a potato peeling disc 7 according to the invention from below. The potato peeling disc 7 has a disc portion 48 extending radially fully outward from a central hub portion 49 having the opening 38 and the inner contour 39. The teeth 17 can be seen from below in FIG. 5A because, with the disc portion 48 having a substantially constant disc thickness, the teeth 17 project at the upper side. In particular, the teeth on the lower side form a recess corresponding to the protrusion contour on the surface. In particular, FIG. 5A shows such recesses corresponding to the protrusions of the teeth shown, for example, in FIG. 5B.

The teeth 17 are arranged on parallel annular tracks 16 which run coaxially around the central axis 40. The teeth themselves have a rectangular outer contour and/or are not curved. In top view and/or bottom view, the teeth have a substantially square outer contour. There are sections in the circumferential direction between two columns 14 between which the teeth have been omitted. There is a smooth surface 18 at the upper side (and lower side).

In one configuration, the orientation of the teeth 17 is in the direction of the respective annular track 16, preferably parallel to a tangent to the annular track 16, wherein the tangent passes through a point of intersection of a central longitudinal axis of a tooth 17 with the annular track 16.

Tests have shown that a particularly small number of slits, e.g. four slits, create a particularly aesthetic impression on the user because special attention is then paid to them, creating an image that is relaxing for the user. On the other hand, a plurality of slits, e.g. eighteen slits, can also be perceived as particularly aesthetic and appealing. For this perception by the user, it is irrelevant whether the slits at an angular position extend radially in a continuous opening or are divided into multiple openings. Such multi-part slits, e.g. slits divided into three parts in the direction of extension at an angular position, arouse a slit-surface overall impression in the user, which is also perceived as particularly attractive. The aesthetic impression on the user can be improved by a slightly curved course of the slits radially away from the central axis, because this is perceived as dynamic and modern. In tests, users have found it particularly positive when the surface 18 is only partially covered with abrasive structures, because the alternation of smooth and non-smooth surface sections triggers a surprising, interesting feeling in the observer, who is not used to such a sight. It conveys a feeling of innovation and high quality. In particular, this was obtained by four sections in the circumferential direction, which have alternating smooth and abrasive structures. The individual arrangement of teeth 17, which are adjacent to slits 14, were also arranged according to purely aesthetic considerations.

The potato peeling disc 7 is attached to a tool 9 with the opening 38 for peeling potatoes. Radially inwardly directed beads extending along the central axis 40, which are distributed over the circumference of the inner contour 39, serve to ensure a stable fit of the potato peeling disc 7 on the rotatable tool 9 of the food processor 1. A cut-out 43 permits axial projecting of a central end element of the tool, e.g. a fastening rivet, and, at the same time, the creation of an axial latch arm 44 with a latching lug 45 projecting radially inwards at its free end, which can engage in a corresponding groove 42, in particular annular groove, of the tool 9 in the intended attachment position of the potato peeling disc 7 on the rotatable tool 9. A manually releasable, but stable fit of the potato peeling disc 7 in the attached state can thus be achieved. In particular, this is a snap-fit connection. A driver 25 enables coupling of the tool 9 with the potato peeling disc 7, so that a rotation of the tool 9 leads to a rotation of the potato peeling disc 7, in particular with the same rotational speed. At least one bore 7, preferably two bores, and/or at least one notch 50, preferably two notches 50, allow for improved water transport to the surface 18.

A rotational speed of at least 500 rpm and/or at most 1100 rpm is preferably used to peel the potatoes. The unit "rpm" stands for revolutions per minute. Potatoes can be sufficiently peeled in at least 4 and/or at most 7 minutes.

FIG. 5B shows a schematic representation of a section running centrally through a potato peeling disc 7, in particular the potato peeling disc 7 of FIG. 5A. In FIG. 5B, teeth 17 projecting on the surface 18 of the potato peeling disc 7 are visible. In the sectional representation shown, the potato peeling disc 7 has an overall curved shape. In particular, the disc portion 48 of the potato peeling disc 7 extends in a waveform around the hub portion 49. In the sectional view of FIG. 5B, a wave crest of the wave shape is visible. The driver 25 extends axially downward starting from the outer edge of the hub portion 49, The length of the driver 25 is at least half as long as the opening 38. FIG. 5B shows the cut-out 43 that creates the latch arm 44. The latching lug 45 is arranged at the free end of the latch arm 44.

In one configuration, the disc portion 48 has essentially the shape of a perforated disc in top view, i.e., a disc with a central through bore. Preferably, also in the case of a potato peeling disc 7 having a wave shape, an inner edge of the disc portion 48 is on a plane perpendicular to the central axis 40. From this plane inner edge, which is preferably connected to the hub portion 49 in particular by a material bond (over-molding or bonding) or by a force fit (clamped from above and below), the disc portion 48 extends in the radial direction with different slopes depending on the angular position relative to the central axis 40. While the inner edge of the disc portion 48 is on a plane perpendicular to the central axis 40, the outer edge describes a wave in circumferential direction with at least one or two wave crests and wave troughs.

In particular, the potato peeling disc 7 comprises metal and/or is constructed in two parts or exactly three parts, i.e., produced from separately manufactured parts. Alternatively, the entire potato peeling disc 7 is produced in one piece by means of injection molding from plastic.

Preferably, the disc portion 48 is made of metal, preferably a sheet, in particular with a (constant) thickness of at least 1 mm and/or at most 2 mm. In one configuration, the hub portion 49 is produced from plastic, preferably poly-propylene, and/or is overmolded around an inner edge region of the disc portion 48. Preferably, the hub portion 49 is also produced from two separately manufactured parts, in particular a lower part and an upper part. The diameter 46 of the opening 38 is 17 mm, preferably with a transition fit.

Figure 5C:
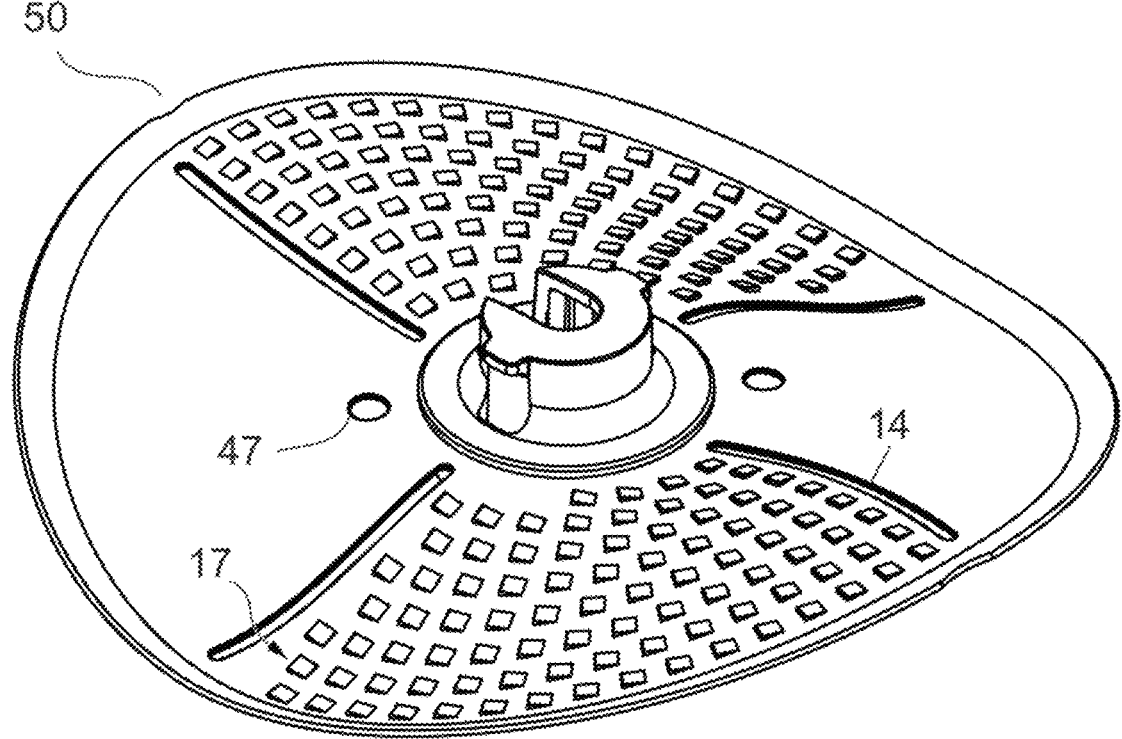
FIG. 5C illustrates a schematic perspective representation of a potato peeling disc, in particular of FIGS. 5A and/or 5B.

FIG. 5C shows a potato peeling disc, in particular of FIGS. 5A and/or 5B, in a perspective representation from obliquely above. The ramp shape of the teeth 17 is clearly visible here.

Figures 6A, 6B, 6C, 6D:
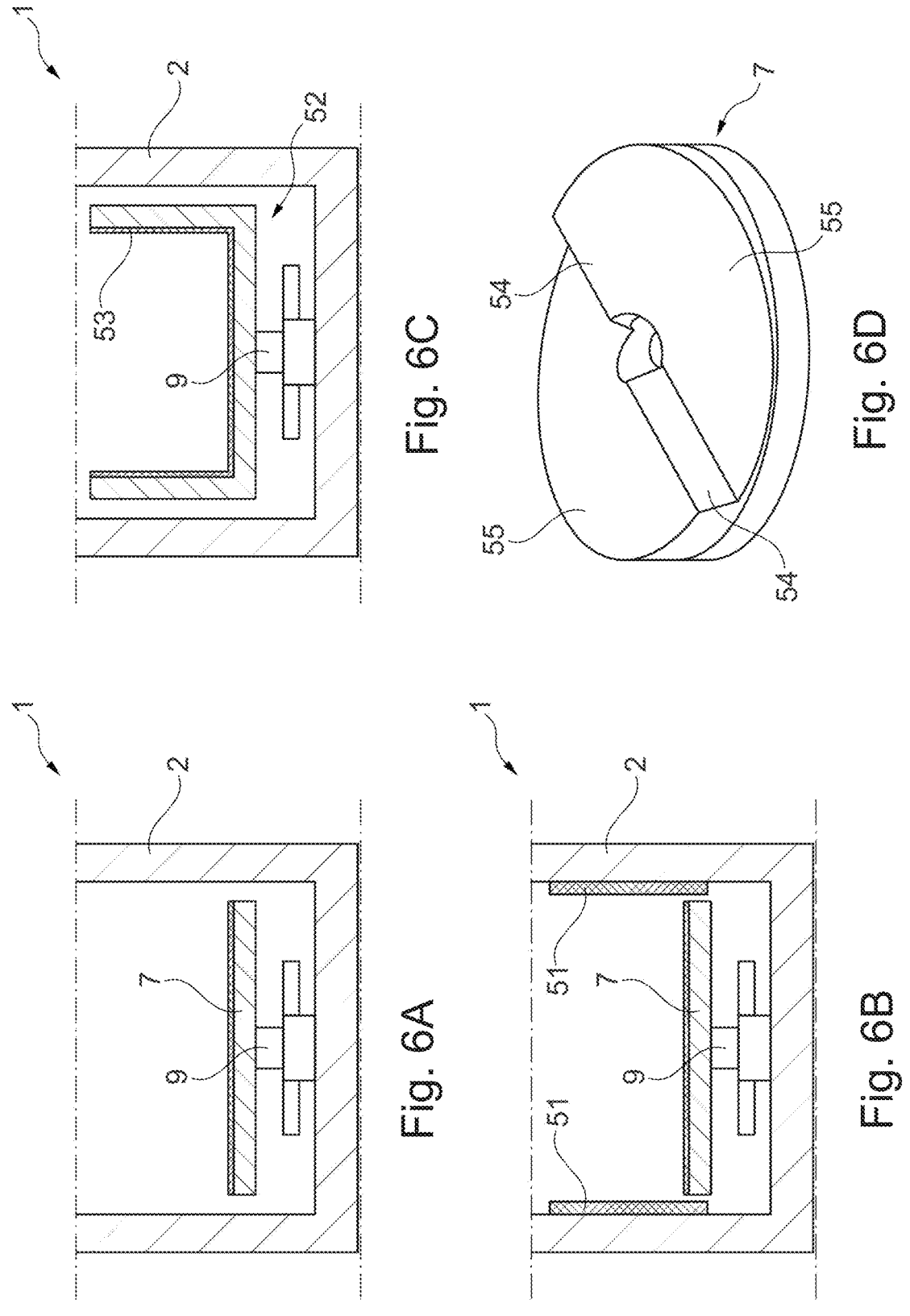
FIG. 6A illustrates a schematic cross-sectional representation of a plane potato peeling disc in a food processor.
FIG. 6B illustrates a schematic cross-sectional representation of a wall insert in a food preparation vessel of a food processor with attached potato peeling disc.
FIG. 6C illustrates a schematic cross-sectional representation of a potato peeling pot insert in a food preparation vessel of a food processor.
FIG. 6D illustrates a schematic representation of a geometry of a potato peeling disc (abrasive structure hidden).

FIG. 6A shows a schematic cross-sectional representation of a flat potato peeling disc in a food processor 1 (cf. FIG. 1), wherein the potato peeling disc is attached to a rotatable tool 9 of the food processor 1 and is located inside the food preparation vessel 2. In FIG. 6A only a section of the food processor 1 is shown. An abrasive structure with oriented teeth is shown in a simplified manner as a thick line on the upper side of the potato peeling disc 7. In the following exemplary embodiments, the potato peeling disc 7 just illustrated may be planar, wave-like, or wave-shaped.

FIG. 6B shows a schematic cross-sectional representation of the exemplary embodiment of FIG. 6A with an additional wall insert 51. Also in the case of the wall insert 51, the abrasive structure with teeth is shown in a simplified manner as a thick line. The wall insert 51 is preferably flat, arcuate and/or adapted to the surface of the inner wall of the food preparation vessel 2 of the food processor 1 and/or can be manually releasably attached thereto. Potatoes are peeled more efficiently in this way.

FIG. 6C shows a schematic cross-sectional representation of a potato peeling pot insert 52. Here, too, the abrasive structure with teeth is shown in a simplified manner as a thick line. A pot insert 52 can be produced from the potato peeling disc 7 as the base and a pot insert wall 53.

FIG. 6D shows a schematic representation of a geometry of a potato peeling disc 7, which comprises steps 54. The abrasive structure with teeth is also hidden here. In principle, it is possible to provide the abrasive structure by means of a releasable layer with a maximum thickness of 2 mm, which can be changed as required. Ramp-shaped sections 55 extend in the circumferential direction up to such a step 54. Steps 54 and ramp-shaped sections 55 are therefore found alternating in the circumferential direction.

Preferably, for peeling the potatoes in the food preparation vessel 2, e.g. 600 ml of water is added to the food preparation vessel to create a water bath. In operation, the mixing and/or chopping tool causes an ascending flow of water below the potato peeling disc 7. The potatoes are peeled in the raw state, preferably at e.g. 800 rpm for 50 s for 200 g potatoes and 100 s for 600 g potatoes, wherein intermediate values with respect to the peeling time can be linearly interpolated. In this way, potato peeling can be carried out significantly faster than when the potatoes are peeled manually, with less waste of potato mass.

In one embodiment, the potato peeling disc has a wave-like, preferably wave-shaped shape. The combination of a wave-like shaped potato peeling disc with a plurality of teeth with orientation leads in a synergetic way to a particularly high efficiency of the peeling process. The potatoes are catapulted upwards by the wave-shaped shape of the potato peeling disc in a particularly frequent manner and rotated around their own axis in a particularly effective manner. The wave-like shape causes the potatoes (or e.g. beets) to randomly rotate and bounce in the food preparation vessel, so that over time the potatoes are peeled from each side and the entire potato surface by interaction with the teeth. The peel of the potatoes is not peeled excessively long in one location. The peel is removed evenly. In particular, an outer edge of the potato peeling disc runs in a wave-shaped manner. Preferably, this outer edge is closed and has a continuous course over the entire circumference, i.e., without steps or interruptions. In one configuration, the outer edge of the potato peeling disc has arcuate notches to allow water to flow from the bottom up from the edge to the surface. For this purpose, in a further configuration, one or two openings, for example in the form of bores through the surface of a corrugated region of the potato peeling disc, may alternatively or additionally be introduced. In one configuration, a potato peeling disc having a wave-like shape has one or more ramp-shaped portions in the circumferential direction. In one configuration, a potato peeling disc having a wave-like shape has at least one and/or at most four, most preferably exactly two, wave crests and/or wave troughs extending radially from the central opening. The surface of a potato peeling disc having a wave-shaped shape preferably extends in a serpentine and/or sinusoidal manner in the circumferential direction. It is preferably a potato peeling disc having a three-dimensionally circumferentially wave-like or wave-shaped shape relative to the substantially cylindrical inner contour. The distance from the wave trough to the wave crest measured parallel to the central axis is at least 10% and/or at most 30% of the diameter of the potato peeling disc.

In one configuration, the potato peeling disc comprises a plurality of slits. The combination of a potato peeling disc with slits on the one hand and a plurality of teeth with orientation on the other hand also leads in a synergetic manner to a particularly high efficiency of the peeling process. Especially during peeling in a water bath, the slits allow very effective transport of peeled peel, Soiling and covering of the teeth of the potato peeling disc can thus be reduced. A slit forms an opening for the passage of water from the underside of the potato peeling disc to the surface. The number of slits is technically insignificant, as one slit is already sufficient to allow water to pass through the disc to the surface. When peeling is not performed in a water bath, air flows through the slits partially contribute to loosening of peel residues, but not as effectively as in a water bath. The slits may be equally spaced in the circumferential direction, for example, and/or may extend substantially radially outward from the central axis, for example, in a curved shape. The curved shape of the slits may extend opposite to the direction of rotation for peeling and/or be curved in such a way that the beginning of the slit to the end of the slit has an angular change measured parallel to the surface of the potato peeling disc of at least 5° and/or at most 30° or 45°. For example, the slit is at least 2 mm and/or at most 8 mm wide. For example, the beginning of the slit is at least 5 mm in the radial direction from the inner contour of the central opening. For example, the end of the slit is at least 3 mm away from the outer edge of the potato peeling disc. In particular, a total of at least 2 and/or at most 30 slits are provided. In principle, the slits may be subdivided in the radial direction into at least 2 and/or at most 5 partial slits which are not continuously connected to one another by an opening. The slits may also be continuous in the radial direction, i.e. not subdivided. The above-mentioned geometric features of the slits give the user different impressions, which will be explained in more detail later.

Studies have shown that a particular synergy for the peeling process in a water bath can be achieved from the combination of firstly teeth with orientation, secondly potato peeling disc having a wave-like shape and thirdly an opening for the passage of water from a lower side to the surface of an upper side of the potato peeling disc. This is due to the rising water exiting from the surface of the potato peeling disc in conjunction with the rocking surface motion with the teeth due to the potato peeling disc having a wave-like shape rotating about the central axis through the water bath during operation.

In one embodiment, the teeth are ramp-like, preferably ramp-shaped. Polishing of the potatoes, avoiding damage to a plastic bag around a food or slow cooking without undesired damage to the food by the teeth of the potato peeling disc can be enabled in this way. Consequently, a complex cooking process that includes peeling and polishing or peeling and slow cooking can be realized particularly efficiently. Time-consuming dismounting or turning of the potato peeling disc can be omitted.

A ramp-like tooth has a bevel in the direction of orientation of the tooth, wherein the length of the bevel in the direction of orientation of the tooth is greater than the height of the tooth. The bevel may be shaped as a ramp surface or as a ridge. In a line-like ridge, two surfaces collide that extend laterally from the ridge (in particular at an angle of at most 135°) to the surface of the potato peeling disc. A ramp-shaped or ramp-like shape of the teeth allow that by rotating the potato peeling disc in a direction opposite to the direction of rotation for peeling, a correspondingly blunt part of the teeth (i.e. ramp surface or ridge with the two laterally sloping surfaces) will act on the potatoes, resulting in the above-mentioned effects. In contrast, by rotating the potato peeling disc in the direction of rotation for peeling, i.e. essentially in the direction of orientation of the teeth, peeling of potatoes can be performed by engaging a peeling edge on a front side of the teeth in the direction of orientation of the teeth.

In one embodiment, the teeth in the direction of the respective orientation—measured from the adjacent surface of the potato peeling disc—have a slope angle α of at least 140° and/or at most 175°. Thus, no peeling of the potatoes takes place anymore when the direction of rotation is reversed. In an embodiment, the teeth in the direction of the respective orientation measured from the adjacent surface of the potato peeling disc have a slope angle α of preferably at least 155° and/or at most 170°. A polished surface of a peeled potato, which is smoother on the surface and more compacted, can thus be obtained when the direction of rotation is reversed. This embodiment also supports food preparations of the "slow cooking" and "sous vide" type.

In one embodiment, the teeth of the potato peeling disc are arranged on annular tracks. The annular tracks run in a circular arc around the central axis. The teeth can thus be arranged particularly densely and still peel particularly efficiently. In particular, at least 6, preferably at least 8, and/or at most 30 annular tracks are provided. In particular, the teeth are arranged centered on an annular track in the direction of orientation of the teeth, i.e., a central axis of a tooth in the direction of orientation runs along or lies tangentially on a circular arc-shaped axis of an annular track. In one configuration, the teeth in the orientation direction do not have an arcuate extension, but preferably have a rectangular extension in the orientation direction. The above-mentioned geometric features are viewed and described from a top view of the surface of the potato peeling disc. In principle, an arcuate extension of a tooth in the direction of orientation is also possible, so that then its longitudinal axis runs along the annular track, i.e. arcuate in a top view. If a tooth is triangular in top view, its ridge lies tangentially on the annular track.

In one embodiment, the teeth are equally spaced in the circumferential direction. The distance is to be measured along the annular track. For example, the distance can be specified in mm or as a radian measure. Preferably, the distance measured along the annular track is approximately one length of the teeth on the annular track between which the distance is measured. Preferably, the distance is at least 1 mm and/or at most 4 mm. A distance of approximately 3 mm is particularly preferred, because this achieves maximum peeling efficiency.

In particular, all teeth of the potato peeling disc have the same length in the direction of orientation, the same width transverse to the direction of orientation, the same height relative to the adjacent surface, the same distance to the following tooth on the same annular track, and/or the same distance to the next tooth on an adjacent annular track. This same distance can be deviated from if there is a gap between two teeth.

In one embodiment, a plurality of annular tracks are provided coaxially to the central axis at an equal radial distance from each other. In particular, the radial distance corresponds approximately to a radial extension of a tooth. In one configuration, the radial distance is at least 1 mm and/or at most 5 mm, preferably about 3 mm. A particularly efficient peeling can thus be made possible.

In one configuration, the teeth have a tetrahedron shape. This enables particularly efficient peeling. Viewed from above, a tetrahedron shape has a triangular base, a triangular face at the front and two triangular faces at the back. In total, a tetrahedron shape has four corners.

In one embodiment, the teeth have a rectangular ramp shape. Particularly efficient peeling in the one direction of rotation and smoothing in the opposite direction of rotation can thus be achieved. Preferably, the teeth are produced by injection molding from plastic or by forming the surface from metal. In particular, the teeth form a recess on a lower surface and a protrusion on the opposite surface. In particular, the protrusion is provided without an opening. Preferably, the tooth has a width (in a direction transverse to the direction of orientation) of at least 2 mm and/or at most mm, particularly preferably about 3 mm. Preferably, the tooth has a length in the direction of orientation of at least 3 mm and/or at most 5 ram, preferably about 4 mm. Preferably, the tooth has a height relative to the adjacent surface of the potato peeling disc of less than 1 mm, preferably at least 0.2 mm.

In particular, the potato peeling disc comprises a disc portion having the teeth and a central connection part for installation to a rotatable tool for mixing and/or chopping. In particular, the entire surface or only at least a portion of the surface of the disc portion is provided with teeth.

In one embodiment, the inner contour forms the central opening in such a way that the potato peeling disc with the central opening can be attached to a rotationally symmetrical body with an outer diameter of exactly 17 mm, so that in the attached state the inner contour rests against the rotationally symmetrical body in particular over a length of preferably at least 3 mm, particularly preferably at least 10 mm in the direction of the central axis, in particular uniformly at several points (e.g. by means of inwardly curved protrusions) which are distributed uniformly over the circumference. The length of at least 3 mm has the advantage that improved rotational stability can be achieved, in particular when producing from metal. The length of at least 10 mm has the advantage, particularly when producing from plastic, that the driver for the rotary coupling to the tool is relieved. The provision of inwardly curved protrusions made of plastic has the advantage that the protrusions can adapt elastically with a transition fit or interference fit with respect to the diameter 17 mm during installation on the rotationally symmetrical body to fit over at least 15 mm in such a way that no gap-related radial movement clearance occurs between the body and the inner contour. A particularly reliable peeling, driven by a rotating tool of a food processor, can thus be enabled. In particular, the central connection part comprises the inner contour.

In one embodiment, the inner contour forms, by means of a U-shaped cut-out, a latch arm extending parallel to the central axis, which is provided with a latching lug projecting radially in the direction of the central axis, so that during installation the latching lug grinds along the rotationally symmetrical body with the outer diameter of exactly 17 mm in the direction of the central axis, i.e. under pretension, and is capable to engage in a recess, in particular an annular groove, of the rotationally symmetrical body if the rotationally symmetrical body has such a recess, in particular an annular groove. Due to the fact that the latching lug projects radially inwards, a pre-tension of the latching lug on the rotationally symmetrical body with an outer diameter of exactly 17 mm occurs as a result of an elastic, radial pivoting outwards when the inner contour is attached to the rotationally symmetrical body and the latch arm with the latching lug is thereby displaced outwards. If the rotationally symmetrical body has a circumferential annular groove, the latching lug will engage there due to the pretension. Preferably, the latch arm and latching lug are arranged such that when the provided attached state is reached, the latching lug snaps into the annular groove. Preferably, a free end of the rotationally symmetrical body and/or rotatable tool then abuts a base or step in the base of the central opening. Further preferably, a through opening is provided in the base of the central opening with a diameter that is smaller—preferably about half as large—as the diameter of the central opening. A central axial protrusion, for example a rivet on the free end of the rotatable tool for mixing and/or chopping, can in this way extend through the through opening and not obstruct the abutment of the remaining free end of the tool in the base, i.e., on a shoulder in the base. In this case, the cut-out preferably extends to the through opening and/or the cut-out has a width corresponding to the diameter of the through opening.

In one configuration, the teeth are each formed by a protrusion from the surface of the potato peeling disc. In one configuration, the entire protrusion is made of solid material. In one configuration, the surface of the potato peeling disc and the teeth of the potato peeling disc are made in one piece. Particularly preferably, the entire potato peeling disc is made in one piece or in multiple pieces. When the potato peeling disc comprises metal, a two-piece or exactly three-piece construction is preferred. Alternatively, the teeth and the surface may be of different materials. In one configuration, the teeth are made of sheet metal and/or formed or stamped from the surface. In one configuration, the teeth and surface are produced from the same material, preferably plastic or metal.

In one embodiment, the potato peeling disc including the surface and teeth is produced by injection molding, metal casting or sheet metal forming. This makes the potato peeling disc particularly efficient to use for a long time.

In one configuration, all edges, peeling edges and/or contours of the teeth are rounded. This reduces the adhesion of peeling residues and ensures a particularly efficient peeling process.

In one embodiment, the teeth have a peeling edge angle β of at least 80° and/or at most 100°, particularly preferably about 91°, to the adjacent surface of the potato peeling disc in the direction of the respective orientation. In this way, adhesion of peeling residues can be reduced and a particularly efficient peeling process can be ensured.

In one embodiment, the potato peeling disc is such that the inner contour is adapted to the outer contour of a rotationally symmetrical body. When the potato peeling disc with the central opening is attached to a rotationally symmetrical body for driving the potato peeling disc, the inner contour lies closely against the outer contour, but without a rotationally fixed connection between the inner contour and the outer contour. Only potato peeling discs are known which can form a rotationally fixed coupling to a drive shaft via a central opening. Due to the sometimes large torque forces acting on the potato peeling disc and between the potato peeling disc and the drive shaft during the peeling of potatoes, it was recognized that omitting a means for achieving a rotationally fixed coupling through the central opening increases the robustness and efficiency of the potato peeling disc.

In one configuration, the driving torque is transmitted to the potato peeling disc by means of a rotary flow of a water bath, by means of friction and/or by means of at least one driver. Preferably, a snap lock serves for transmitting torque by friction and/or simultaneously for holding the potato peeling disc in its axial position relative to a driving body. Particularly preferably, the snap lock engages a circumferential groove of the driving body. In an alternative or complementary configuration, the driver is arranged at a distance radially from the central opening on the potato peeling disc in order to absorb, with a longer lever arm, the torque forces from a likewise radially located region of the driving body.

A further aspect of the invention relates to a food processor comprising a potato peeling disc, in particular according to the aspect of the invention described at the beginning. The food processor serves for performing a food preparation process by heating, chopping and/or mixing a food in a food preparation vessel by means of a heating element for heating and a mixing or chopping tool, wherein the potato peeling disc can be manually releasably attached to the tool. A particularly efficient peeling and preparing of food is thus enabled. In operation, the inner contour of the potato peeling disc encloses an upper cylindrical portion of the tool onto which the central opening has been attached. A rotary flow is created in the water bath by the mixing or chopping tool. If no driver is provided, the potato peeling disc is carried along by this rotary flow and set in rotation. A snap lock or a elastically deformable inwardly facing projection of the potato peeling disc may be provided to engage a circumferential groove in the upper, cylindrical portion of the tool to counteract axial lift-off of the potato peeling disc from the tool. Preferably, a driver can be coupled on the underside of the potato peeling disc to an arm of the tool to transmit a torque. Potatoes can be placed on the potato peeling disc, which is preferably surrounded by a water bath. By rotating the potato peeling disc, the potatoes are peeled. When the direction of rotation is reversed, no peeling of the potatoes occurs.

In one embodiment—or a further aspect relating to a potato peeling disc for peeling potatoes for use and operation with a food processor by mounting and rotationally coupling the potato peeling disc with a rotatable mixing or chopping tool of the food processor—an angular tooth is provided, in particular a cuboid tooth, wherein a plurality of the teeth are positioned on a surface of the potato peeling disc and/or face with a front surface tangential, substantially tangentially or parallel to a circumferential direction. Thus, the orientation of the teeth is in the circumferential direction or at least substantially in the circumferential direction. In particular, the teeth have a first surface at the rear side with an angle α to the surface of the potato peeling disc and/or a second surface at the front side, i.e. in particular the front surface, with an angle β to the surface of the potato peeling disc. A plateau, which is preferably straight and/or substantially parallel to the surface of the potato peeling disc, connects the first surface and the second surface. In particular, the angle α and/or the angle β is between 80° and 100°, preferably about 90°. A normal of the first and/or second surface is oriented tangentially, substantially tangentially, or parallel to the circumferential direction of the potato peeling disc. In particular, a normal of the first surface and a normal of the second surface lie in a plane that is preferably oriented parallel to the central axis.

In one embodiment or a further aspect, a wall insert having an abrasive structure or a potato peeling pot insert having an abrasive structure are provided. In particular, a wall insert having an abrasive structure may be attached in the food preparation vessel, preferably on the inner wall thereof, i.e., the inner circumferential surface thereof. Alternatively, a potato peeling pot insert having an abrasive structure can be arranged in the food preparation vessel. Either the pot insert lies against the inner wall of the food preparation vessel or is circumferentially spaced therefrom during operation. The abrasive structure or configurations and variants described above are preferably teeth that have already been described in the aspect of the invention described at the beginning. Other abrasive structures as described in some of the following aspects are also possible. A pot insert consists essentially of a circumferential pot insert wall and a bottom having the features of the potato peeling disc. A pot insert can be produced from the potato peeling disc as a bottom and a pot insert wall.

A further aspect of the invention relates to a method of peeling potatoes with a food processor, in particular the food processor according to the preceding aspect of the invention, and a potato peeling disc, in particular according to the aspect of the invention described at the beginning. The potato peeling disc has a central opening formed by an inner contour of the potato peeling disc. The surface of the potato peeling disc comprises a plurality of teeth having an orientation. The method comprises the following steps: Installing the potato peeling disc with the central opening onto a mixing or chopping tool of the food processor, which is located in a food preparation vessel of the food processor, in particular at the bottom; feeding water into the food preparation vessel such that at least the teeth of the potato peeling disc are surrounded by water; activating the food processor to rotate the tool in a first direction of rotation about a central axis coaxial with the central opening to peel the potatoes; activating the food processor to rotate the tool in a second direction of rotation opposite to the first direction of rotation to perform a food preparation process not including peeling of potatoes by means of the potato peeling disc which has not been released since installation on the tool.

A further aspect of the invention relates to a potato peeling disc having on its surface a plurality of teeth having a rectangular ramp shape in an orientation direction and arranged along parallel circular annular tracks such that a height of a tooth in the orientation direction which is tangential to the annular track increases in particular continuously so that the height of the tooth at a beginning of a tooth is less than the height of the tooth at its end as viewed in the orientation direction. Peeling when the teeth are rotated in the orientation direction and smoothing when they are rotated in the opposite direction can thus be made possible.

A further aspect of the invention relates to a potato peeling disc having a plurality of teeth on its surface, wherein a disc portion of the potato peeling disc is produced from a sheet metal and the plurality of teeth are produced by forming the sheet metal. In particular, the teeth each form a recess which is waterproof and can be used as a container for water when the potato peeling disc is turned over so that the teeth face downward. The effort required to clean the potato peeling disc can be significantly reduced in this way.

A further aspect of the disclosure relates to a potato peeling disc for peeling potatoes, wherein the potato peeling disc has a central opening formed by an inner contour of the potato peeling disc, wherein a surface of the potato peeling disc has a plurality of teeth with an orientation and/or an abrasive surface structure with a grain size of at most 800 μm, in particular at most 600 μm and/or at least 500 μm. Alternatively or additionally, the potato peeling disc has at least one or at most four sections which are ramp-shaped in the circumferential direction. Particularly preferred are only one or only two ramp-shaped sections. A ramp-shaped section has essentially the shape of a ring segment with an ascending height in the circumferential direction followed by a descending step. In this way, the potatoes can be peeled during operation on the one hand, and on the other hand, they can be better mixed to be peeled more homogeneously. If the step is not steep, but flatly sloping (with an angle of e.g. at least 30°), polishing, i.e. smoothing of the potato surface roughened by peeling with the abrasive surface structure, can be achieved when changing the direction of rotation of the potato peeling disc. The graining is produced by abrasives, in particular by sand or ceramic particles, e.g. aluminum oxide (corundum), silicon carbide, chromium(III) oxide or zirconium(IV) oxide. Preferably, the graining is coated with a waterproof varnish layer. Preferably, the height of the step of the ramp-shaped section is at least 5 mm and/or at most 25 mm, particularly preferably about 15 mm.

A further aspect relates to a potato peeling pot insert, the pot bottom of which has the features of the potato peeling disc according to one of the preceding aspects of the invention. The inner circumferential surface of the cylindrical pot portion may then also have an abrasive surface with oriented teeth and/or a graining. In this way, the peeling time can be further reduced. The potato peeling pot insert is preferably inserted into the food preparation pot of a food processor and/or fastened with the pot bottom to the rotatable mixing and/or chopping tool of the food processor, such that in operation the tool rotates the potato peeling pot insert. In an alternative aspect, a system comprising a potato peeling disc according to one of the preceding aspects of the invention and a wall insert having an abrasive surface with oriented teeth and/or a graining. In particular, the abrasive surface has the same features as described in one or more embodiments in the context of the potato peeling disc. In particular, the wall insert has a substantially conical shape in the direction of the longitudinal axis, i.e., in the assembled state in the direction of the central axis. In this way, the wall insert can be easily inserted into a likewise substantially conically shaped food preparation vessel from above and automatically remains (by gravity) in a provided insert position. Alternatively or additionally, the wall insert may comprise fastening means, in particular one or more outwardly extending bulges, upwardly extending hooks or downwardly extending feet, to reliably remain in the provided insertion position in a food preparation vessel while potatoes are peeled. In particular, the wall insert may be multi-piece. However, a one-piece wall insert is preferred.

A further aspect relates to a potato peeling disc having a plurality of teeth or abrasive elements on its surface for peeling potatoes, wherein the potato peeling disc is characterized in that the potato peeling disc is such that it can be attached to a rotatable tool of a food processor releasably (i.e. non-destructively manually releasably), preferably by manual attaching. In particular, the potato peeling disc has a central opening for this purpose, which is preferably formed by an inner contour of the potato peeling disc. In particular, the surface of the potato peeling disc comprises teeth or abrasive elements with steep surfaces (e.g. with an inclination of 80° to 100°), preferably 90°) for forming a cutting edge for peeling, so that by rotating the potato peeling disc in a first and/or second direction of rotation about a central axis, which is in particular coaxial to the central opening, potatoes are or can be peeled by the teeth. A further aspect relates to a use of a potato peeling disc in a food processor for preparing a food by heating and/or chopping. In particular, the potato peeling disc has the features explained in the previous aspect.

The invention claimed is:

1. A potato peeling disc for peeling potatoes, wherein the potato peeling disc has a central opening formed by an inner contour of the potato peeling disc, wherein a surface of the potato peeling disc comprises a plurality of teeth having an orientation such that potatoes are peeled by the teeth by rotating the potato peeling disc in a first direction of rotation about a central axis which is coaxial with the central opening, wherein the potato peeling disc is configured to be manually releasably attached to a mixing or a chopping tool, and wherein the inner contour forms, by means of a U-shaped cut-out, a latch arm extending parallel to the central axis, wherein the latch arm includes a latching lug projecting radially in the direction of the central axis, such that during installation the latching lug grinds along a rotationally symmetrical body with an outer diameter of exactly 17 mm in the direction of the central axis, and wherein the rotationally symmetrical body defines a recess and during installation the latching lug is configured to engage in the recess.

2. The potato peeling disc of claim 1, wherein the potato peeling disc has a wave-like shape.

3. The potato peeling disc of claim 1, wherein the potato peeling disc comprises a plurality of slits.

4. The potato peeling disc of claim 1, wherein the teeth are ramp-like or and/or have a rectangular ramp shape.

5. The potato peeling disc of claim 1, wherein the teeth have a slope angle α of at least 140° and at most 175° in the direction of the respective orientation measured from the adjacent surface of the potato peeling disc.

6. The potato peeling disc of claim 1, wherein the potato peeling disc defines a plurality of annular tracks disposed coaxially to the central axis at an equal radial distance from each other.

7. The potato peeling disc of claim 1, wherein the inner contour forms the central opening such that the potato peeling disc is attachable with the central opening onto the rotationally symmetrical body having the outer diameter of exactly 17 mm, and wherein, when the potato peeling disc is in the attached state, the inner contour rests against the rotationally symmetrical body over a length of at least 10 mm in the direction of the central axis.

8. A food processor comprising:

a food preparation vessel;

a heating element and a mixing or chopping tool for preparing a food in the food preparation vessel; and a potato peeling disc having a central opening formed by an inner contour of the potato peeling disc, wherein a surface of the potato peeling disc comprises a plurality of teeth having an orientation such that potatoes are peeled by the teeth by rotating the potato peeling disc in a first direction of rotation about a central axis which is coaxial with the central opening, wherein the potato peeling disc is configured to be manually releasably attached to the mixing or chopping tool, wherein the inner contour forms, by means of a U-shaped cut-out, a latch arm extending parallel to the central axis, wherein the latch arm includes a latching lug projecting radially in the direction of the central axis, such that during installation the latching lug grinds along a rotationally symmetrical body with an outer diameter of exactly 17 mm in the direction of the central axis, and wherein the rotationally symmetrical body defines a recess and during installation the latching lug is configured to engage in the recess.

9. The food processor of claim 8, wherein the plurality of teeth having the orientation such that potatoes are not peeled by the teeth by rotating the potato peeling disc in a second direction of rotation, which is opposite to the first direction of rotation.

10. The food processor of claim 8, wherein the potato peeling disc has a wave-like shape.

11. The food processor of claim 8, wherein the potato peeling disc comprises a plurality of slits.

12. The food processor of claim 8, wherein the teeth are ramp-like.

13. The food processor of claim 8, wherein the teeth have a slope angle $\alpha$ of at least 140° and at most 175° in the direction of the respective orientation measured from the adjacent surface of the potato peeling disc.

14. The food processor of claim 8, wherein the teeth of the potato peeling disc are arranged on annular tracks.

15. The food processor of claim 8, wherein the potato peeling disc defines a plurality of annular tracks disposed coaxially to the central axis at an equal radial distance from each other.

16. The food processor of claim 8, wherein the teeth have an equal distance in the circumferential direction, which is at least 1 mm and/or at most 4 mm.

17. The food processor of claim 8, wherein the teeth have a rectangular ramp shape.

18. The food processor of claim 8, wherein the teeth in the direction of the respective orientation have a peeling edge angle $\beta$ of at least 80° or at most 100° to the adjacent surface of the potato peeling disc.

19. The food processor of claim 8, wherein the inner contour forms the central opening such that the potato peeling disc is attachable with the central opening onto the rotationally symmetrical body having the outer diameter of exactly 17 mm, and wherein, when the potato peeling disc is in the attached state, the inner contour rests against the rotationally symmetrical body over a length of at least 10 mm in the direction of the central axis.

* * * * *